(12) United States Patent
Roy et al.

(10) Patent No.: US 8,793,641 B1
(45) Date of Patent: Jul. 29, 2014

(54) SYSTEM AND METHOD FOR DETERMINING POWER LEAKAGE OF ELECTRONIC CIRCUIT DESIGN

(71) Applicants: Amit Roy, Greater Noida (IN); Shyam S. Gupta, Nodia (IN); Nipun Mahajan, New Delhi (IN); Vijay Tayal, Nodia (IN); Chetan Verma, Nodia (IN)

(72) Inventors: Amit Roy, Greater Noida (IN); Shyam S. Gupta, Nodia (IN); Nipun Mahajan, New Delhi (IN); Vijay Tayal, Nodia (IN); Chetan Verma, Nodia (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/902,873

(22) Filed: May 27, 2013

(51) Int. Cl.
*G06F 17/50* (2006.01)
(52) U.S. Cl.
CPC ................................. *G06F 17/5081* (2013.01)
USPC .......................................................... 716/136
(58) Field of Classification Search
USPC .......................................................... 716/136
See application file for complete search history.

(56) References Cited

U.S. PATENT DOCUMENTS

| 7,814,339 | B2 | 10/2010 | Monferrer |
| 7,930,670 | B2 * | 4/2011 | Cox .............................. 716/126 |
| 2009/0210848 | A1 * | 8/2009 | Cox ................................. 716/12 |
| 2013/0305199 | A1 * | 11/2013 | He et al. ........................ 716/104 |

OTHER PUBLICATIONS

Lipeng Cao, "Circuit Power Estimation Using Pattern Recognition Techniques," Computer Aided Design, 2002. ICCAD 2002. IEEE/ACM International Conference on , vol., No., pp. 412,417, Nov. 10-14, 2002.
Burch, R.; Najm, F.N.; PingYang, B.S.; Trick, Timothy N., "A Monte Carlo Approach for Power Estimation," Very Large Scale Integration (VLSI) Systems, IEEE Transactions on, vol. 1, No. 1, pp. 63,71, Mar. 1993.
C-S. Ding, Q. Wu, C-T. Hsieh and M. Pedram, "Stratified random sampling for power evaluation," IEEE Trans. on Computer Aided Design, vol. 17, No. 6, Jun. 1998, pp. 465-471.
Diana Marculescu; Radu Marculescu; and Massoud Pedram,Information Theoretic Measures for Power Analysis,IEEE Transactions on Computer Aided Design for Integrated Circuits, Jun. 1996, vol. 15, Issue 6, pp. 599-610.

* cited by examiner

*Primary Examiner* — Thuan Do
*Assistant Examiner* — Mohammed Alam
(74) *Attorney, Agent, or Firm* — Charles Bergere

(57) ABSTRACT

A system and method for determining power leakage of an electronic circuit design that includes a plurality of digital logic elements, using an electronic design automation (EDA) tool that includes a processor and an automatic test pattern generation (ATPG) tool for generating multiple sets of input value strings. The ATPG tool generates test patterns that include input value strings for simulating each digital logic element of the circuit design independently. A mapping between generated output values and corresponding input values is stored in a look up table (LUT). Thereafter, the ATPG tool generates test patterns that include input value strings for simulating the real-time behavior of the circuit design. The processor determines power leakage of the circuit design based on probability of occurrence of each unique input value string at the input of each digital logic element and corresponding predetermined power leakage values.

9 Claims, 3 Drawing Sheets

SYSTEM AND METHOD FOR DETERMINING POWER LEAKAGE OF ELECTRONIC CIRCUIT DESIGN

BACKGROUND OF THE INVENTION

The present invention relates generally to electronic circuits, and, more specifically to a method for determining power leakage of an electronic circuit.

Electronic circuits are designed using multiple digital logic elements and often are prone to power leakage. Power leakage is the power consumed by the electronic circuit due to unintended leakage of power in the digital logic elements and is used to determine a supply-ground configuration of each digital logic element, as well as power consumption and package selection of the electronic circuit. Incorrect determination of power leakage can lead to unexpected power consumption, incorrect supply-ground configuration and incorrect package selection. Incorrect supply-ground configuration further can result in improper operation of the circuit, while incorrect package selection can lead to improper heat dissipation, which affects the power characteristics of the circuit. Thus, accurate determination of power leakage is crucial for proper operation of the electronic circuit.

Several techniques are used to determine power leakage. One such technique determines the power leakage by multiplying a gate count of the circuit and a standard average power leakage value of a particular gate type, such as a NAND gate. Another method models all of the digital logic elements as p-channel and n-channel transistors and determines cumulative widths of all p-channel and n-channel transistors. Thereafter, a p-channel transistor with a width equal to the cumulative width of all the p-channel transistors and an n-channel transistor with a width equal to the cumulative width of all the n-channel transistors are simulated and the power leakage is determined.

The power leakage of a digital logic element varies considerably based on its inputs. The variation between lowest and highest power leakages of the digital logic element based on the inputs may be quite high (ranging up to ten times). However, none of the above-mentioned techniques determines the power leakage of the digital logic element based on the inputs provided to the digital logic element.

There are some other techniques that determine power leakage based on the inputs provided to the digital logic elements. In one such technique, an electronic circuit design is simulated for all possible input values corresponding to application software for which it is designed and the power leakage is determined based on the simulations. However, determining the power leakage for each possible input value of the application software is time consuming. Another method uses a probabilistic mathematical model to determine probabilities of occurrences of all possible inputs at each digital logic element, based on which the power leakage of each digital logic element is calculated. However, to determine the probabilities of occurrences of all possible inputs, the correlation between all digital logic elements needs to be known and obtaining the correlation is computationally complex and further time consuming. Statistical simulation techniques such as Monte Carlo simulation may also be used, however, these techniques require numerous simulations for accurate determination of the power leakage and are time consuming and require large amounts of memory. Yet another method simulates the electronic circuit design for a set of random test inputs. Thereafter, a feature vector representing most likely inputs of the random test inputs is generated and the power leakage values obtained. However, determining the feature vector is difficult and renders the method inefficient.

Therefore, it would be advantageous to have a system and method that accurately determines power leakage of an electronic circuit design, that is not time consuming, and that overcomes the limitations of the existing methods of determining power leakage.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
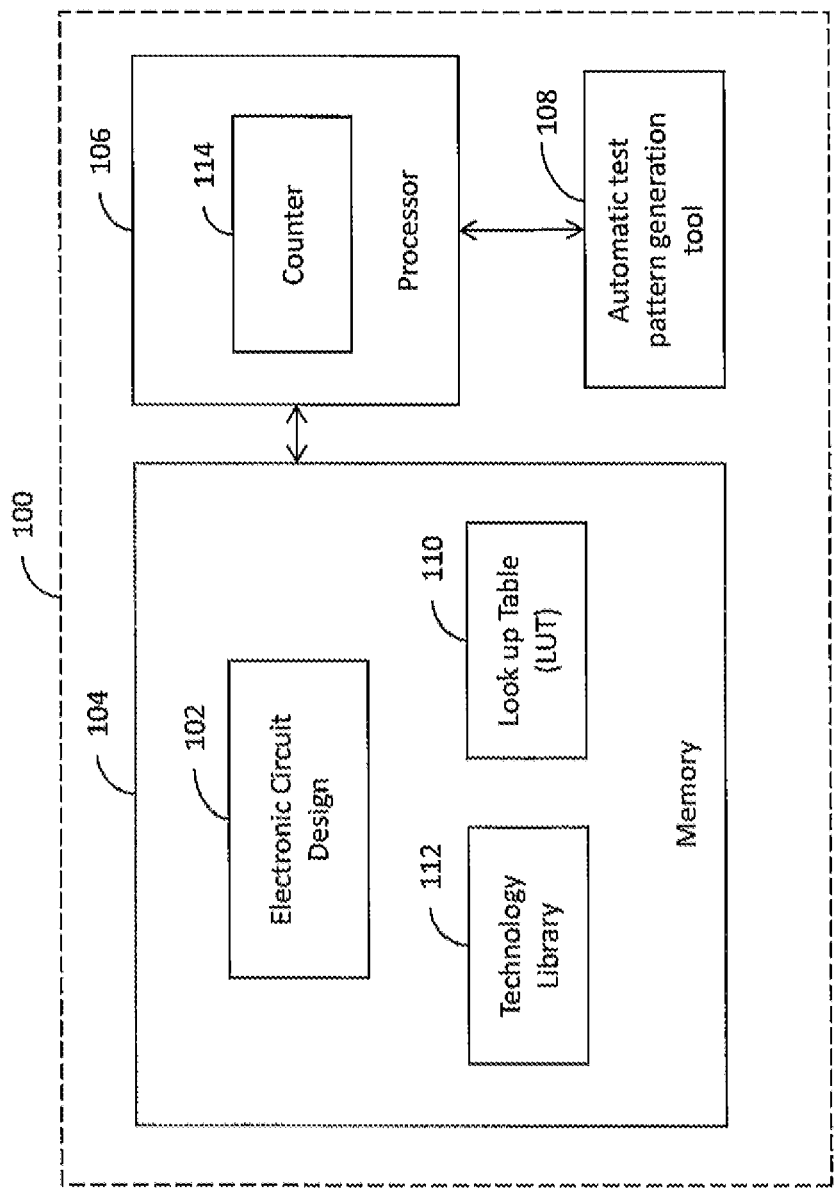
FIG. 1 is a schematic block diagram of an electronic design automation (EDA) tool for estimating the power leakage of an electronic circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for determining power leakage of an electronic circuit design using an electronic design automation (EDA) tool is provided. The EDA tool includes an automatic test pattern generation (ATPG) tool for generating a set of test patterns that includes first and second sets of input value strings, a memory for storing the electronic circuit design and a processor that includes a counter for generating count values. The electronic circuit design includes a plurality of digital logic elements including first and second digital logic elements. An output of the first digital logic element is connected to an input of the second digital logic element. The first and second digital logic elements are individually simulated, using first and second sets of input value strings, respectively. First and second sets of output value strings are generated at outputs of the first and second digital logic elements, respectively. A look-up table is generated that stores a mapping between the first and second sets of input value strings and corresponding first and second sets of output value strings. The counter is instructed to generate first and second sets of count values corresponding to occurrence of at least one of logic zero and one values at inputs of the first and second digital logic elements, respectively, for simulating the electronic circuit design, based on the look-up table. A plurality of input probability values are determined corresponding to probability of occurrence of at least one of logic zero and one values at the inputs of the first and second digital logic elements, based on the first and second sets of input value strings and the first and second sets of count values, respectively. Power leakages values of the first and second digital logic elements are determined based on the plurality of input probability values and predetermined power leakage values of the first and second digital logic elements corresponding to occurrence of at least one of logic zero and one values at the inputs of the first and second digital logic elements.

Various embodiments of the present invention provide a system and method for determining power leakage of an electronic circuit design, using an electronic design automation (EDA) tool. The electronic circuit design includes a plurality of digital logic elements including first and second digital logic elements and an output of the first digital logic element is connected to an input of the second digital logic element. A processor of the EDA tool simulates the first and second digital logic elements independently using first and second sets of input value strings generated by an automatic test pattern generator (ATPG) tool and generates first and second sets of output value strings, respectively. The processor stores a mapping between the first and second sets of input value strings and corresponding first and second sets of output value strings in a look-up table (LUT) of the EDA tool. Thereafter, the ATPG tool generates test patterns for simulating the real-time behavior of the electronic circuit design. In this case, instead of simulating the entire electronic circuit design with the test patterns, a counter of the EDA tool generates first and second sets of count values corresponding to occurrence of logic zero and one values at inputs of the first and second digital logic elements, based on the LUT. This considerably reduces the time required for simulating the entire electronic circuit design. Further, power leakages of the first and second digital logic elements are determined based on predetermined power leakage values of the first and second digital logic elements and probability of occurrence of logic zero and one values at the inputs of the first and second digital logic elements. Before transferring the electronic circuit design to a chip, designers can use the power leakage information to optimize and meet the power requirements of the chip, thus ensuring smooth and proper functioning of the chip.

Referring now to FIG. 1, a schematic block diagram of an electronic design automation (EDA) tool 100 for determining a power leakage of an electronic circuit design 102 in accordance with an embodiment of the present invention, is shown. The EDA tool 100 includes a memory 104 and a processor 106 in communication with the memory 104. The memory 104 receives and stores the electronic circuit design 102. The electronic circuit design 102 may be any circuit design that includes digital logic elements. Examples of digital logic elements include an AND gate, an OR gate, a NOT gate, a NOR gate, a NAND gate, an XOR gate, an XNOR gate, and/or a combinational logic circuit such as a flip-flop, a shift-register, a multiplexer and a demultiplexer.

The processor 106 and memory 104 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art. Examples of the electronic circuit design 102 include microprocessor, microcontroller unit (MCU), system-on-chip (SOC), and application specific integrated circuit (ASIC) designs.

Figure 2:
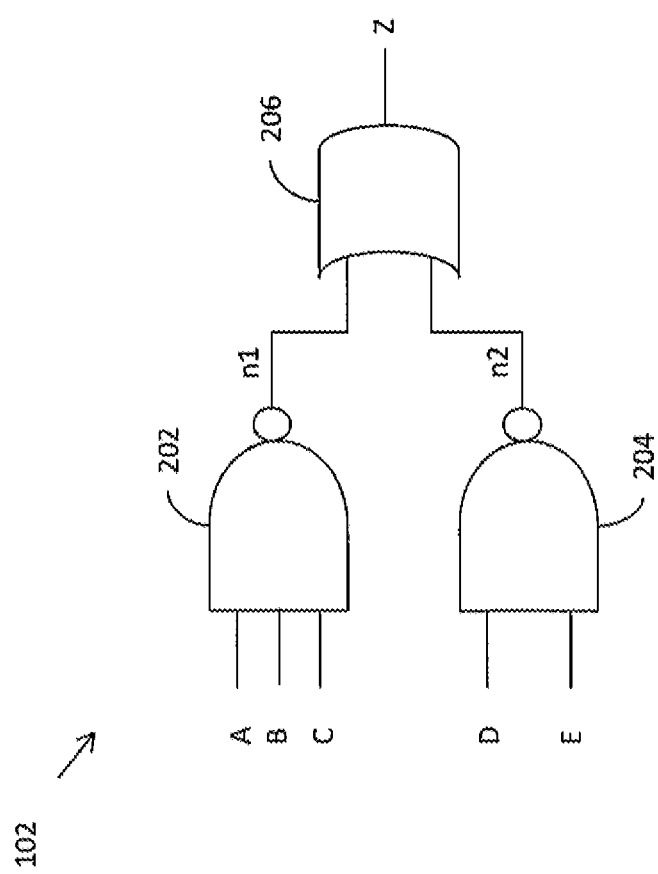
FIG. 2 is a schematic diagram of an exemplary circuit design in accordance with an embodiment of the present invention.

An example of the electronic circuit design 102 has been illustrated in FIG. 2. The electronic circuit design 102 includes first and second NAND gates 202 and 204 and an OR gate 206. The first NAND gate 202 is a three-input NAND gate that receives A, B and C as inputs and generates n1 as an output. The second NAND gate 204 is a two-input NAND gate that receives D and E as inputs and generates n2 as an output. The OR gate 206 is connected to the first and second NAND gates 202 and 204 and receives n1 and n2 as inputs and generates Z as an output.

The EDA tool 100 further includes an automatic test pattern generation (ATPG) tool 108 that generates test patterns for simulating the electronic circuit design 102 to determine power leakage thereof. A test pattern includes input value strings (combination of logic 0's and 1's) that are used to simulate each digital logic element independently or the complete electronic circuit design 102. In operation, the ATPG tool 108 first generates test patterns for simulating each digital logic element independently. These test patterns include input value strings that simulate each digital logic element with maximum possible input/output combinations. In the current example, the ATPG tool 108 generates test patterns that include eight input value strings for simulating the first NAND gate 202 and four input value strings each, for simulating the second NAND gate 204 and the OR gate 206. The input value strings for each digital logic element and corresponding output values are stored in a look-up table (LUT) 110. The LUT 110 is located in the memory 104. Table A below illustrates the entries of the LUT 110:

TABLE A

Entries of the LUT 110

| First NAND gate 202 | | | | Second NAND gate 204 | | | OR gate 206 | | |
|---|---|---|---|---|---|---|---|---|---|
| A | B | C | n1 | D | E | n2 | n1 | n2 | Z |
| 0 | 0 | 0 | 1 | 0 | 0 | 1 | 0 | 0 | 0 |
| 0 | 0 | 1 | 1 | 0 | 0 | 1 | 0 | 1 | 1 |
| 0 | 1 | 0 | 1 | 1 | 0 | 1 | 1 | 0 | 1 |
| 0 | 1 | 1 | 1 | 1 | 1 | 0 | 1 | 1 | 1 |
| 1 | 0 | 0 | 1 | | | | | | |
| 1 | 0 | 1 | 1 | | | | | | |
| 1 | 1 | 0 | 1 | | | | | | |
| 1 | 1 | 1 | 0 | | | | | | |

The memory 104 further includes a technology library 112. The technology library 112 stores predetermined power leakage values of each digital logic element of the electronic circuit design 102, for each input value string.

Thereafter, the ATPG tool 108 generates test patterns for simulating the entire electronic circuit design 102 (i.e., all the digital logic elements together). These test patterns include those input value strings that are used to simulate the real-time behavior of the electronic circuit design 102. In the current example, the ATPG tool 108 may generate test patterns that include input value strings as shown in Table B below:

TABLE B

Input value strings generated by the ATPG tool 108

| A | B | C | D | E |
|---|---|---|---|---|
| 1 | 1 | 0 | 0 | 1 |
| 1 | 1 | 1 | 1 | 1 |
| 0 | 1 | 0 | 0 | 1 |
| 0 | 1 | 0 | 1 | 1 |

The output of the first and second NAND gates 202 and 204 (n1 and n2) is provided as an input to the OR gate 206 and is shown in the Table C below:

TABLE C

Outputs of the first and second NAND gates 202 and 204

| n1 | n2 |
|---|---|
| 1 | 1 |
| 0 | 0 |
| 1 | 1 |
| 1 | 0 |

Thereafter, instead of simulating the electronic circuit design 102 for the input value strings listed above, the processor 106 generates a count of unique logic zeros and ones appearing at the inputs (A, B, C, n1 and n2) by way a counter 114, by referring to the LUT 110. The unique count values of input strings appearing at the inputs (A, B, C) of the first NAND gate 202, the inputs (D, E) of the second NAND gate 204 and the inputs (n1, n2) of the OR gate 206 are shown in the Table B below.

TABLE D

Count values for the first and second NAND gates 202 and 204 and the OR gate 206

| First NAND gate 202 | | Second NAND gate 204 | | OR gate 206 | |
|---|---|---|---|---|---|
| Input value string | Count values | Input value string | Count values | Input value string | Count values |
| 000 | 0 | 00 | 0 | 00 | 1 |
| 001 | 0 | 01 | 2 | 01 | 0 |
| 010 | 2 | 10 | 0 | 10 | 1 |
| 011 | 0 | 11 | 2 | 11 | 2 |
| 100 | 0 | | | | |
| 101 | 0 | | | | |
| 110 | 1 | | | | |
| 111 | 1 | | | | |

Thereafter, the processor 106 determines a probability of occurrence of each input value string at the inputs of each digital logic element. The probability of occurrence is determined based on the total number of input value strings that appear at an input of a digital logic element of the electronic circuit design 102. In the current example, four input value strings each appear at the inputs (A, B, C) of the first NAND gate 202, the inputs (D, E) of the second NAND gate 204 and the inputs (n1, n2) of the OR gate 206. Thus, using the count values from Table D, the processor 106 determines the probability of occurrence of each input string, as illustrated in the Table E below:

TABLE E

Probabilities of occurrence values for the first and second NAND gates 202 and 204 and the OR gate 206

| First NAND gate 202 | | Second NAND gate 204 | | OR gate 206 | |
|---|---|---|---|---|---|
| Input value string | Probability of occurrence | Input value string | Probability of occurrence | Input value string | Probability of occurrence |
| 000 | 0 | 00 | 0 | 00 | 1/4 |
| 001 | 0 | 01 | 2/4 | 01 | 0 |
| 010 | 2/4 | 10 | 0 | 10 | 1/4 |
| 011 | 0 | 11 | 2/4 | 11 | 2/4 |
| 100 | 0 | | | | |
| 101 | 0 | | | | |
| 110 | 1/4 | | | | |
| 111 | 1/4 | | | | |

The processor 106 then fetches the predetermined power leakage values from the technology library 112 for each digital logic element of the electronic circuit design 102, corresponding to each unique input value string appearing at its input. The power leakage of a digital logic element for a unique input value string corresponds to a product of the probability of occurrence of the unique input value string at the input of the digital logic element and a predetermined power leakage value of the digital logic element corresponding to the unique input value string. The processor 106 repeats the above process for all unique input value strings appearing at the input of the digital logic element and determines the total power leakage of the digital logic element by computing a sum of all power leakage values corresponding to unique input value strings. The processor 106 calculates the power leakage of other digital logic elements of the electronic circuit design 102 in a similar manner. A sum of the power leakages of the plurality of digital logic elements provides the power leakage of the electronic circuit design 102.

In the current example, the processor 106 fetches the predetermined power leakage values of the first and second NAND gates 202 and 204 and the OR gate 206, for each unique input value string appearing at corresponding inputs thereof. Table F below illustrates these predetermined power leakage values:

TABLE F

Entries of the technology library 112

| First NAND gate 202 | | Second NAND gate 204 | | OR gate 206 | |
|---|---|---|---|---|---|
| Input value string | Predetermined power leakage value (mW) | Input value string | Predetermined power leakage value(mW) | Input value string | Predetermined power leakage value(mW) |
| 000 | $1.15184 * 10^{-7}$ | 00 | $2.12113 * 10^{-7}$ | 00 | $3.5359 * 10^{-6}$ |
| 001 | $2.04062 * 10^{-7}$ | 01 | $8.98625 * 10^{-7}$ | 01 | $3.00806 * 10^{-6}$ |
| 010 | $2.10143 * 10^{-7}$ | 10 | $1.07795 * 10^{-6}$ | 10 | $2.77603 * 10^{-6}$ |
| 011 | $8.51335 * 10^{-7}$ | 11 | $1.56451 * 10^{-6}$ | 11 | $2.11951 * 10^{-6}$ |
| 100 | $2.10459 * 10^{-7}$ | | | | |
| 101 | $8.86365 * 10^{-7}$ | | | | |
| 110 | $1.06622 * 10^{-6}$ | | | | |
| 111 | $2.45659 * 10^{-6}$ | | | | |

Subsequently, the processor 106 calculates the power leakage values of the first and second NAND gates 202 and 204 and the OR gate 206 as $7.50044*10^{-7}$, $9.38299*10^{-7}$, and $2.85988*10^{-6}$, respectively. Finally, the processor 106 determines the power leakage of the electronic circuit design 102 of FIG. 2 as $9.8576*10^{-7}$, $12.31562*10^{-7}$, and $2.63765*10^{-6}$.

The present invention may be implemented by using a computer based artificial neural network where each digital logic element of the electronic circuit design 102 forms a node of the neural network. The processor 106 trains each digital logic element of the electronic circuit design 102 independently, with maximum possible number of unique combinations of logic zero and one values and then performs the above-mentioned steps to determine the power leakage of the electronic circuit design 102.

Figure 3:
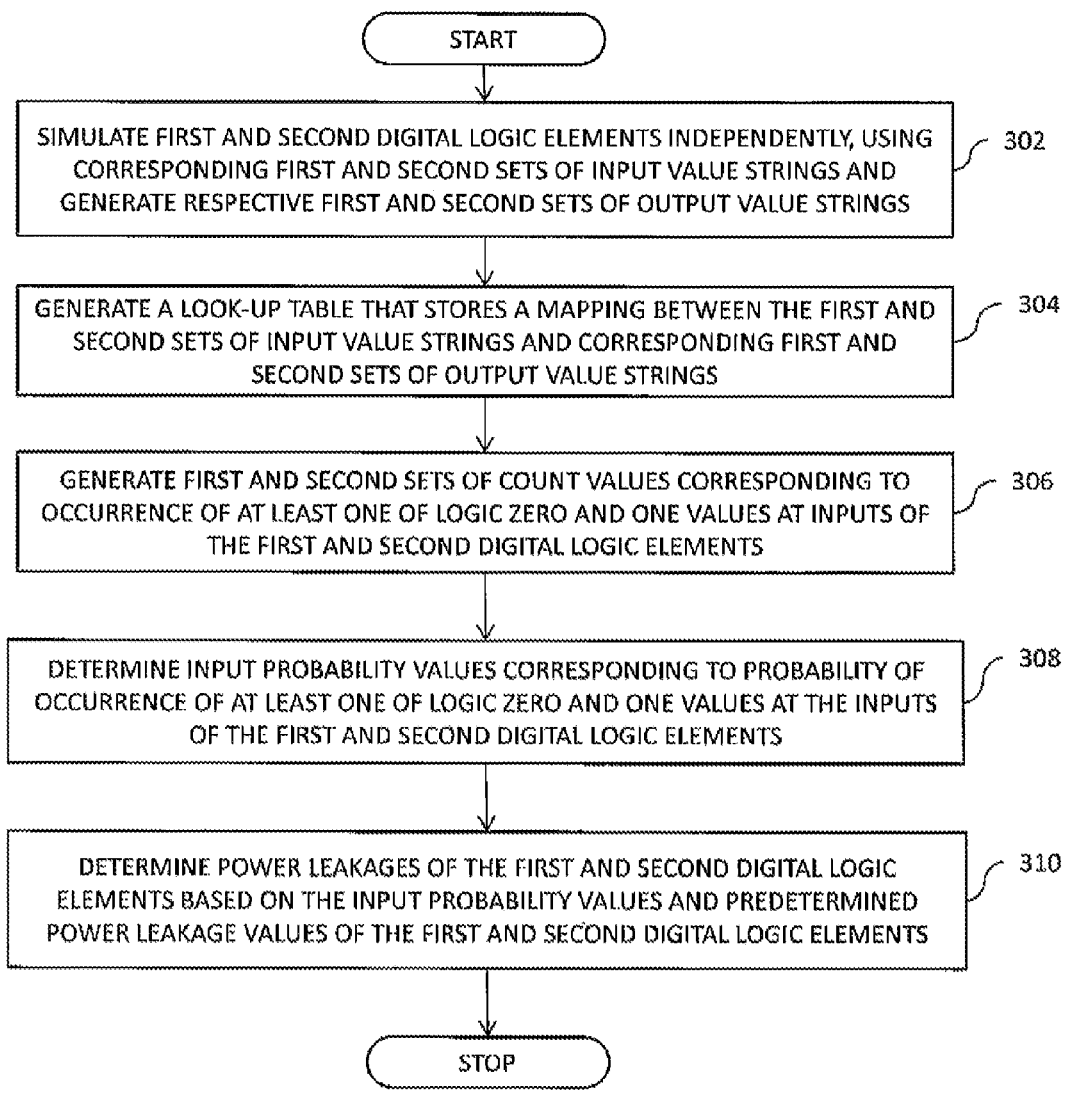
FIG. 3 is a flow chart illustrating a method for determining the leakage power of an electronic circuit design in accordance with an embodiment of the present invention.

Referring now to FIG. 3, a flowchart illustrating a method for determining power leakage of the electronic circuit design 102, in accordance with an embodiment of the present invention is shown. The steps of FIG. 3 are explained in conjunction with FIG. 1 and FIG. 2. The electronic circuit design 102 is input to the EDA tool 100 and in an example includes the first and second NAND gates 202 and 204 and the OR gate 206. The outputs of the first and second NAND gates 202 and 204, n1 and n2, are connected to the inputs of the OR gate 206. The ATPG 108 generates test patterns that include input value strings that are provided to the first and second NAND gates 202 and 204 and the OR gate 206. At step 302, the processor 106 simulates the first and second NAND gates 202 and 204 and the OR gate 206 independently, using the input value strings generated by the ATPG tool 108. At step 304, the processor 106 generates the LUT 110 that stores a mapping between the input values strings provided to the first and second NAND gates 202 and 204 and the OR gate 206 and corresponding output values. The ATPG tool 108 then generates test patterns for simulating the entire electronic circuit design 102 (i.e., all the digital logic elements together). The test patterns include those input value strings that correspond to the real-time behavior of the electronic circuit design 102. Thereafter, at step 306, the counter 114 generates count values that provide counts of occurrence of logic zeroes and ones at the inputs of the first and second NAND gates 202 and 204 and the OR gate 206, by referring to the LUT 110. At step 308, the processor 106 determines the probability of occurrence of each unique input value string at inputs of the first and second NAND gates 202 and 204 and the OR gate 206, using the count values generated by the counter 114. Subsequently, at step 310, the processor 106 fetches the predetermined power leakage values of the first and second NAND gates 202 and 204 and the OR gate 206, for each unique input value string appearing at corresponding inputs thereof. The processor 106 repeats the above process for all unique input value strings appearing at the input of the first NAND gate 202 and determines the total power leakage of the first NAND gate 202 by computing a sum of all power leakage values corresponding to unique input value strings provided to the first NAND gate 202. Similarly, the processor 106 determines total power leakage of the second NAND gate 204 and the OR gate 206. Thus, the power leakage of the electronic circuit design 102 is determined by summing the total power leakages of the first and second NAND gates, 202 and 204, and the OR gate 206.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for determining power leakage of an electronic circuit design, wherein the electronic circuit design includes a plurality of digital logic elements including first and second digital logic elements, and wherein an output of the first digital logic element is connected to an input of the second digital logic element, the EDA tool comprising:
an automatic test pattern generation (ATPG) tool for generating a set of test patterns that includes first and second sets of input value strings;
a memory that stores the electronic circuit design; and
a processor in communication with the memory and the ATPG tool, wherein the processor includes a counter that generates count values, and wherein the processor:
simulates the first and second digital logic elements individually, using the first and second sets of input value strings and generates first and second sets of output value strings at outputs of the first and second digital logic elements, respectively;
creates a look-up table that stores a mapping between the first and second sets of input value strings and the corresponding first and second sets of output value strings;
instructs the counter to generate first and second sets of count values corresponding to occurrences of at least one of logic zero and logic one values at inputs of the first and second digital logic elements, respectively, for simulating the electronic circuit design, based on the look-up table;
determines a plurality of input probability values corresponding to a probability of occurrence of at least one of logic zero and logic one values at the inputs of the first and second digital logic elements, based on the first and second sets of input value strings and the first and second sets of count values, respectively; and
determines power leakages of the first and second digital logic elements based on the plurality of input probability values and predetermined power leakage values of the first and second digital logic elements corresponding to the occurrences of at least one of logic zero and logic one values at the inputs thereof.

2. The EDA tool of claim 1, wherein each of the plurality of digital logic elements includes at least one of an AND gate, an OR gate, a NOT gate, a NOR gate, a NAND gate, an XOR gate, an XNOR gate.

3. The EDA tool of claim 1, wherein the input of the first digital logic element is a primary input of the electronic circuit design.

4. The EDA tool of claim 1, wherein the memory further includes a library of predetermined power leakage values.

5. The EDA tool of claim 1, wherein the first and second sets of input value strings each include predetermined combinations of logic zero and logic one values to be provided to the first and second digital logic elements, respectively.

6. A method for determining power leakage of an electronic circuit design using an electronic design automation (EDA) tool that includes an automatic test pattern generation (ATPG) tool for generating a set of test patterns including first and second sets of input value strings, a memory for storing the electronic circuit design, and a processor that includes a counter that generates count values, wherein the electronic circuit design includes a plurality of digital logic elements including first and second digital logic elements, and wherein an output of the first digital logic element is connected to an input of the second digital logic element, the method comprising:
simulating, using the ATPG tool, the first and second digital logic elements individually, using corresponding first and second sets of input value strings and generating first and second sets of output value strings at outputs of the first and second digital logic elements, respectively;
generating a look-up table in the memory that stores a mapping between the first and second sets of input value strings and the corresponding first and second sets of output value strings;
instructing the counter to generate first and second sets of count values corresponding to occurrence of at least one of logic zero and logic one values at inputs of the first and second digital logic elements, respectively, for simulating the electronic circuit design, based on the look-up table;
determining a plurality of input probability values corresponding to a probability of occurrence of at least one of logic zero and logic one values at the inputs of the first and second digital logic elements, based on the first and second sets of input value strings and the first and second sets of count values, respectively; and
determining power leakages of the first and second digital logic elements based on the plurality of input probability values and predetermined power leakage values of the first and second digital logic elements corresponding to occurrence of at least one of logic zero and logic one values at the inputs thereof, wherein determining the input probability values is performed by the processor.

7. The method of claim 6, wherein each of the plurality of digital logic elements includes at least one of an AND gate, an OR gate, a NOT gate, a NOR gate, a NAND gate, an XOR gate, an XNOR gate.

8. The method of claim 6, further comprising fetching predetermined power leakage values, corresponding to occurrence of at least one of logic zero and logic one values at the inputs of the first and second digital logic elements from a technology library of the memory.

9. The method of claim 6, further comprising providing the first and second sets of input value strings that each include predetermined combinations of logic zero and one values to the first and second digital logic elements, respectively.

\* \* \* \* \*